United States Patent
Zhang (10) Patent No.: US 7,198,043 B1
(45) Date of Patent: Apr. 3, 2007

(54) METHOD FOR EXTENDING DIAMOND TOOL LIFE IN DIAMOND MACHINING OF MATERIALS THAT CHEMICALLY REACT WITH DIAMOND

(76) Inventor: Gang Zhang, 1801 Crest Vista Dr. #1A, Monterey Park, CA (US) 91754

( * ) Notice: Subject to any disclaimer, the term of this patent is extended or adjusted under 35 U.S.C. 154(b) by 0 days.

(21) Appl. No.: 11/466,715

(22) Filed: Aug. 23, 2006

Related U.S. Application Data (60) Provisional application No. 60/711,957, filed on Aug. 26, 2005.

(51) Int. Cl.
*B23C 5/28* (2006.01)
(52) U.S. Cl. .............. 125/39; 219/68; 83/171; 409/131
(58) Field of Classification Search .......... 125/39; 219/68, 70; 204/224 M, 129.46, 225; 83/171; 409/131, 132; 451/8, 57
See application file for complete search history.

(56) References Cited

U.S. PATENT DOCUMENTS

| | | | |
|---|---|---|---|
| 3,862,391 A * | 1/1975 | Blomgren et al. | ............ 219/68 |
| 3,873,436 A * | 3/1975 | Inoue | .................... 204/224 M |
| 3,977,126 A * | 8/1976 | Hohler et al. | ................. 451/72 |
| 4,563,114 A * | 1/1986 | Casstevens | ................ 409/131 |
| 4,641,007 A * | 2/1987 | Lach | ....................... 219/69.17 |
| 5,103,701 A | 4/1992 | Lundin | |
| 6,637,303 B2 | 10/2003 | Moriwaki | |
| 6,776,563 B2 | 8/2004 | Shamoto | |

OTHER PUBLICATIONS

Paul et al., "Chemical Aspects of Tool Wear in Single Point Diamond Turning," Precision Engineering, vol. 18, No. 1, pp. 4-19 (1996).
Kohlscheen et al., "Tailoring of Diamond Machinable Coating Materials," Precision Engineering, vol. 26, No. 2, pp. 175-182 (2002).
Shimada et al., "Suppression of Tool Wear in Diamond Turning of Copper Under Reduced Oxygen Atmosphere," Annals of the CIRP, vol. 49, No. 1, pp. 21-24 (2000).

(Continued)

*Primary Examiner*—Lee D. Wilson
*Assistant Examiner*—Anthony Ojini (57) ABSTRACT

The present invention provides a method for extending diamond tool life in diamond machining of materials that chemically react with the diamond tool in which the surface electric potential of the workpiece is adjusted or tuned to be adequate to inhibit the chemical reaction between the diamond tool and the workpiece during the diamond machining operation. As the chemical reaction is inhibited, the chemical wear rate of the diamond tool is reduced and diamond tool life is extended. The surface electric potential of the workpiece can be adjusted by electrically charging the workpiece. In one embodiment, conduction charging is used to adjust the surface electric potential of the workpiece to inhibit the chemical reaction between the diamond tool and the workpiece. In another embodiment, induction charging is used to adjust the surface electric potential of the workpiece to inhibit the chemical reaction between the diamond tool and the workpiece.

17 Claims, 3 Drawing Sheets

OTHER PUBLICATIONS

Shimada, et al., "Thermo-chemical Wear Mechanism of Diamond Tool in Machining of Ferrous Metals," Annals of the CIRP, vol. 53, No. 1, pp. 57-60 (2004).
Evans, "Cryogenic Diamond Turning of Stainless Steel," Annals of the CIRP, vol. 40, No. 1, pp. 571-575 (1991).
Moriwaki et al., "Ultraprecision Diamond Turning of Stainless Steel by Applying Ultrasonic Vibration," Annals of the CIRP, vol. 40, No. 1, pp. 559-562 (1991).

Shamoto et al., "Ultraprecision Diamond Cutting of Hardened Steel by Applying Elliptical Virbration Cutting," Annals of the CIRP, vol. 48, No. 1, pp. 441-444 (1999).
Suzuki et al., "Ultraprecision Micromachining of Hardened Steel by Applying Ultrasonic Elliptical Vibration Cutting," Proceedings of 2003 International Symposium on Micromechatronics and Human Science, Nagoya, Japan, pp. 221-226 (2003).

* cited by examiner

METHOD FOR EXTENDING DIAMOND TOOL LIFE IN DIAMOND MACHINING OF MATERIALS THAT CHEMICALLY REACT WITH DIAMOND

CROSS-REFERENCE TO RELATED APPLICATIONS

This application claims the benefit of provisional patent application Ser. No. 60/711,957, filed Aug. 26, 2005 by the present inventor.

FIELD OF THE INVENTION

The present invention generally relates to the machining of materials with diamond tools. More particularly, it relates to a method for extending diamond tool life for the diamond machining of materials that chemically react with diamond.

BACKGROUND OF THE INVENTION

Diamond cutting tools are hard and can be made with very sharp cutting edges suitable for ultraprecision diamond machining such as diamond turning, diamond milling and diamond grinding. Diamond turning, also known as single-point diamond turning (SPDT), is an ultra high precision machining technology that uses single-crystal diamond tools with precision control systems to produce optical quality surfaces (e.g., for surface finishing) and/or precisely remove materials (e.g., for micro- and nano-machining) with sub-nanometer level surface finishes and sub-micrometer form accuracies.

One major drawback of diamond machining is that it can only machine a small group of materials that are called diamond machinable materials including some nonferrous metals (e.g., copper, aluminium, electroless nickel (a Ni—P alloy with a phosphorus content more than 10%)), some polymers, and some crystals such as silicon. Diamond machining cannot machine many important engineering materials, which restricts it to be a universal ultraprecision machining process and therefore restricts its applications and market expansion. For example, the metals that are not diamond machinable include ferrous alloys, stainless steel, titanium and its alloys, and nickel and its alloys. Non-diamond machinable materials can extremely quickly wear out diamond tools so that the diamond machining of those materials is not considered cost effective. For instance, turning steel will wear a diamond tool 10,000 times faster than turning brass. Even for turning diamond machinable materials such as copper and electroless nickel, a diamond tool will eventually be worn out although its wear rate is much lower than that for turning non-diamond machinable materials.

Diamond tool wear is a complex phenomenon that is not fully understood yet. Several tool wear mechanisms have been proposed, including 1) adhesion and formation of a built-up edge; 2) abrasion, microchipping, fracture and fatigue; 3) tribo-thermal wear; 4) tribo-chemical wear (e.g., oxidation, diffusion/dissolution, catalyzed graphitization, and carbide formation); 5) thermal-chemical wear, and 6) tribo-electric tool wear. It is not uncommon that multiple mechanisms contribute to diamond tool wear simultaneously under some conditions although there is usually a dominant mechanism for a certain tool/workpiece combination and a certain cutting regime.

Chemical reactive wear (chemical reaction between diamond and workpiece) is one significant tool wear route in diamond machining. In this wear mechanism the surface layer of the diamond tool is transformed from the diamond form of carbon to the graphite form of carbon with the transformation catalyzed by a workpiece such as steel and/or removed due to diamond carbon oxidation by the reduction of the surface oxide of a workpiece such as copper.

Paul et al.'s research on various pure metal elements provides a structural explanation of the chemical wear of the diamond tool resulting from graphitization (see Ed Paul, Chris J. Evans, Anthony Mangamelli, Michael L. McGlauflin and Robert S. Polyani, "Chemical Aspects of Tool Wear in Single Point Diamond Turning," Precision Engineering, Vol. 18, No. 1, pp. 4–19 (1996)). Their hypothesis ascribes this chemical wear to the presence of unpaired d-shell electrons in metals. In other words, if a metal has no unpaired d-shell electrons, it is diamond machinable. In contrast, if a metal has unpaired d-shell electrons, it can catalyze the transformation of diamond carbon into graphite carbon.

This hypothesis explains very well why nickel is not diamond machinable while electroless nickel is diamond machinable. Nickel has two unpaired d-shell electrons. Therefore, it is not diamond machinable. Electroless nickel actually is a nickel-phosphorus (Ni—P) alloy. The p-shell electrons in phosphorus atoms form chemical bonds with the unpaired d-shell electrons in nickel. Therefore, electroless nickel becomes diamond machinable as it has fewer unpaired d-shell electrons than pure nickel.

Kohlscheen et al. also found that although titanium (Ti) is not diamond machinable $TiN_x$ is diamond machinable by adding nitrogen (N) into Ti (see J. Kohlscheen, H. R. Stock and P. Mayr, "Tailoring of Diamond Machinable Coating Materials," Precision Engineering, Vol. 26, No. 2, pp. 175–182 (2002)). This is because covalent bonds form between Ti and N so that unpaired d-shell electrons in Ti are tied up by N.

The above two examples reveals a strategy for tailoring a non-diamond machinable material into a diamond machinable material by adding a suitable element into the non-diamond machinable material for bonding unpaired d-shell electrons in the material.

Shimada et al proposed another chemical wear mechanism in which diamond carbon on the tool surface are removed due to carbon oxidation by the reduction of the surface oxide of the workpiece (see S. Shimada, T. Inamura, M. Higuchi, H. Tanaka and N. Ikawa, "Suppression of Tool Wear in Diamond Turning of Copper Under Reduced Oxygen Atmosphere," Ann CIRP, Vol. 49, No. 1, pp. 21–24 (2000) and S. Shimada, H. Tanaka, M. Higuchi, T. Yamaguchi, S. Honda and K. Obata, "Thermo-chemical Wear Mechanism of Diamond Tool in Machining of Ferrous Metals," Ann CIRP, Vol. 53, No. 1, pp. 57–60 (2004)). For example, when a copper workpiece exposes to an environment containing oxygen such as in a normal diamond turning environment, a layer of copper oxide will form on the copper surface. When the surface diamond carbon of a diamond tool contacts the copper oxide, the carbon is oxidized by the copper oxide while the copper oxide is reduced by the carbon. Although copper is a diamond machinable metal, it still wears the diamond tool at a low chemical wear rate via this wear mechanism. For machining diamond machinable materials such as copper, it is desirable to have a lower chemical wear rate so that a diamond tool can ultraprecisely machine larger copper components or more copper products before it wears out. Diamond machining copper in a reduced oxygen environment will extend diamond tool life.

Several methods have been tried for reducing the chemical wear rate of the diamond tool for machining materials that chemically react with diamond. U.S. Pat. No. 4,563,114, issued on Jan. 7, 1986 to John M Casstevens, teaches a method for reducing diamond tool chemical wear during the machining of steel in a gaseous hydrocarbon-saturated atmosphere such as in a methane environment. The gaseous hydrocarbon inhibits or prevents the conversion of diamond carbon to graphite carbon at the contact point between the diamond tool and the workpiece so that the diamond tool wear is lessened. The reported machinable steel area with this method reached 3 square inches increasing from 0.3 square inches in a normal air environment. Therefore, this method does not significantly increase tool life and can be only used to machine very small steel parts. In addition, this method needs to confine the diamond tool and the workpiece in an enclosure filled with methane. This method is not only impractical for industrial manufacturing, but also not health and safety friendly.

As the rate of a chemical reaction is temperature dependent, Ralph L. Lundin, Delbert D. Stewart and Christopher J. Evans disclosed a method for the reduction of diamond tool chemical wear by chilling the tool and the workpiece to very low temperatures with liquid nitrogen in U.S. Pat. No. 5,103,701 issued on Apr. 14, 1992. The chemical reaction between the diamond tool and the workpiece is retarded at low temperatures so that diamond tool wear is reduced on non-diamond turnable materials. However, up to the present time, the only test results indicated that the tool wear was rather low for machining less than 1000 square millimeters (1.55 square inches) of stainless steel (see C. J. Evans, "Cryogenic Diamond Turning of Stainless Steel," Annals of the CIRP, Vol. 40, No. 1, pp. 571–575 (1991)). The cryogenic method is also not practical for industrial manufacturing because of the difficult integration of a complex chilling system into a precision diamond lathe. In addition, it is difficult to achieve high precision components with this method due to the presence of severe temperature gradients.

Applying an ultrasonic vibration to the diamond tool for machining non-diamond machinable metals such as steel is another method proposed by T. Moriwaki and E. Shamoto (see T. Moriwaki and E. Shamoto, "Ultraprecision Diamond Turning of Stainless Steel by Applying Ultrasonic Vibration", Annals of the CIRP, Vol. 40, No. 1, pp. 559–562 (1991)). In addition to the one-directional ultrasonic vibration assisted diamond turning, Toshimichi Moriwaki, Eiji Shamoto and Makoto Matsuo invented a two-directional or elliptical ultrasonic vibration diamond turning in U.S. Pat. No. 6,637,303 issued in Oct. 28, 2003. The idea of ultrasonic vibration assisted diamond machining (UVADM) is to apply a vibration to the diamond tool in the direction of cutting with ultrasonic frequency so that the diamond tool cut a workpiece intermittently in each vibration cycle. This feature brings several advantages over normal diamond cutting. First, UVADM effectively decreases the contact time between the diamond tool and the workpiece during machining. Secondly, UVDAM allows the cutting fluid to more effectively cool and lubricate the diamond tool and the workpiece. Lastly, UVADM greatly reduces the cutting force. Therefore, shorter contact time, lower average cutting force and better cooling effectiveness contribute to reduce tool wear and extend tool life.

UVADM is a mechanical solution to diamond chemical wear. As the diamond tool still contacts the workpiece, the chemical reaction is inevitable although the diamond tool wear rate is slower. It was reported that the maximum machinable area of hardened stainless steel was only 17 square inches with elliptical ultrasonic vibration diamond turning.

UVADM also has other disadvantages. An extra, high-cost ultrasonic vibration system needs to be installed on a normal diamond turning lathe. The quality of the ultrasonic vibration system is crucial, which determines the surface finish quality of the workpiece to be machined. It is not always easy to precisely align the vibration direction with the cutting direction. The resulting misalignment along with the other imperfect mechanical factors of the vibration system may cause the tool to vibrate laterally. The lateral vibration not only increases surface roughness, but also limits cutting speed, i.e., cutting efficiency. Because the diamond tool periodically cuts the workpiece, vibration marks form on the surface in addition to feed marks, which deteriorate surface finish quality and increase surface roughness. To reduce the influence of vibration marks, to increase surface finish quality, and to increase tool life, the cutting speed and feed rate have to be set as low as possible, which again decreases cutting efficiency. In addition, with this method the diamond tool has to be attached to the ultrasonic vibration system so that the tool cannot be spun and the workpiece has to be spun for the cutting purpose. It is sometime desirable to spin the diamond tool (e.g., flycutting) while holding the workpiece stationary. However, UVADM cannot be applied to this configuration.

SUMMARY OF THE INVENTION

The present invention provides a method for extending diamond tool life in diamond machining of materials that chemically react with the diamond tool in which the surface electric potential of the workpiece is adjusted or tuned to be adequate to inhibit the chemical reaction between the diamond tool and the workpiece.

It is an object of some aspects of the invention to provide a method capable of diamond machining conventional non-diamond machinable materials that chemically react with the diamond tool;

It is an object of some aspects of the invention to provide a method capable of extending diamond tool life for diamond machining conventional non-diamond machinable materials that chemically react with the diamond tool;

It is an object of some aspects of the invention to provide a method capable of extending diamond tool life for diamond machining conventional diamond machinable materials that chemically react with the diamond tool;

It is an object of some aspects of the invention for extending diamond tool life by preventing or reducing the chemical wear rate of the diamond tool resulting from catalytic diamond graphitization.

It is an object of some aspects of the invention for extending diamond tool life by preventing or reducing the chemical wear rate of the diamond tool resulting from the oxidation of diamond carbon by the reduction of the surface oxide of the workpiece.

It is an object of some aspects of the invention for extending diamond tool life by preventing or reducing the physical and/or chemical adsorption of diamond carbon onto the workpiece surface.

It is an object of some aspects of the invention for extending diamond tool life by preventing or reducing the physical and/or chemical adsorption of oxygen onto the workpiece surface.

It is an object of some aspects of the invention for extending diamond tool life by preventing or reducing the growth of the surface oxide of the workpiece.

It is an object of some aspects of the invention to provide a cost-effective method capable of extending diamond tool life;

It is an object of some aspects of the invention to provide a method that can be set up easily for extending diamond tool life;

It is an object of some aspects of the invention to provide a method that can be operated easily for extending diamond tool life; and It is an object of some aspects of the invention to provide a method capable of extending diamond tool life in which the diamond tool may be movable, rotatable, or stationary.

Still other objects and advantages of various aspects of the invention will become apparent to those skilled in the art from a consideration of the ensuing description, drawings and appended claims. The various aspects of the invention, set forth explicitly herein or otherwise ascertained from the teachings herein, may address one or more of the above objects alone or in combination, or alternatively may address some other objects of the invention ascertained from the teachings herein. It is not necessarily intended that all objects set forth above be addressed by any single aspect of the invention even though that may be the case with regard to some aspects.

In a first aspect of the invention, a method capable of extending diamond tool life in diamond machining of a workpiece with a diamond tool, comprising: adjusting the surface electric potential of the workpiece to be adequate to inhibit the chemical reaction between the diamond tool and the workpiece.

In a second aspect of the invention, a method capable of extending diamond tool life in diamond machining of a workpiece with a diamond tool, comprising: adjusting the surface electric potential of the workpiece by electrically charging the workpiece so that the surface electric potential of the workpiece is adequate to inhibit the chemical reaction between the diamond tool and the workpiece.

In a third aspect of the invention, a method capable of extending diamond tool life in diamond machining of a workpiece with a diamond tool, comprising: electrically charging the workpiece by conduction charging so that the surface electric potential of the workpiece is adequate to inhibit the chemical reaction between the diamond tool and the workpiece.

In a forth aspect of the invention, a method capable of extending diamond tool life in diamond machining of a workpiece with a diamond tool in which the workpiece is electrically charged by conduction charging, comprising: providing a power supply comprising two output terminals; providing an electrode; electrically connecting the workpiece to one terminal of the power supply; electrically connecting the electrode to the other terminal of the power supply; and applying a predetermined voltage signal supplied by the power supply to the workpiece and the electrode such that the surface electric potential of the workpiece is adjusted to be adequate to inhibit the chemical reaction between the workpiece and diamond tool.

In a fifth aspect of the invention, a method capable of extending diamond tool life in diamond machining of a workpiece with a diamond tool, comprising: electrically charging the workpiece by induction charging so that the surface electric potential of the workpiece is adequate to inhibit the chemical reaction between the diamond tool and the workpiece.

In a sixth aspect of the invention, a method capable of extending diamond tool life in diamond machining of a workpiece with a diamond tool in which the workpiece is electrically charged by induction charging, comprising: providing a power supply comprising two output terminals; providing two electrodes; electrically connecting one electrode of the two electrodes to one terminal of the power supply; electrically connecting the other electrode of the two electrode to the other terminal of the power supply; applying a predetermined voltage signal supplied by the power supply to the two electrodes to generate an electric field between the two electrodes; and disposing the two electrodes such that the workpiece is located in the generated electric field that induces the workpiece to have an adequate surface electric potential to inhibit the chemical reaction between the workpiece and diamond tool.

Further aspects of the invention will be understood by those skilled in the art upon reviewing the teachings herein. Other aspects of the invention may involve combinations of the above noted aspects of the invention.

DETAILED DESCRIPTION OF PREFERRED EMBODIMENTS OF THE INVENTION

As described above, the previous research on diamond tool chemical wear indicates that one mechanism of tool wear attributes to the graphitization of diamond carbon catalyzed by the workpiece being machined. A catalytic reaction occurs on the surface of a catalyst. The initial steps of a catalytic reaction first involve the physical adsorption of at least one reagent onto the surface of the catalyst, so-called the precursor state for chemical adsorption. Then, the physisorbed reagent moves into its chemisorbed state (chemical adsorption) with or without overcoming a potential energy barrier and is modified to a form that readily undergoes the following catalytic reaction. Physical adsorption attributes to van der Waals forces or electric forces between the reagent and the catalyst. Chemical adsorption results from chemical bond formation, i.e., the sharing of electrons, between the reagent and the catalyst. In the case of the diamond machining of conventional non-diamond machinable metals such as iron, nickel and steel that act as a catalyst, a metal workpiece (e.g., iron) has unpaired d-shell electrons or unfilled d-orbitals. Carbon in the diamond tool is more electronegative than metal atoms in the workpiece and therefore tends to attract the unpaired d-shell electrons in the metal workpiece to form chemical bonds. From the above facts, the physical and chemical adsorption between the surface diamond carbon of the diamond tool and the surface atoms of the workpiece are significantly dependent on the surface electric state (e.g., electric potential) of the workpiece.

The previous research also reveals another chemical wear mechanism in which carbon atoms on the diamond tool surface are removed due to carbon oxidation by the reduction of the surface oxide of a metal workpiece (e.g., copper). The oxidation of a metal workpiece also involves the physical and chemical adsorption of oxygen onto the workpiece surface as the first steps of the oxidation reaction. Oxygen is a strong electron acceptor and tends to adsorb on the adsorption sites that are electron enhanced to form chemical bonds with the surface metal atoms of the workpiece. After an initial monomolecular layer of oxide forms, the continuous growth of the oxide follows an electrochemical reaction mechanism. The metal workpiece as an anode is oxidized and loses its electrons at the metal/oxide interface. Oxygen at the outer surface of the oxide obtains the electrons moving through the oxide film from the metal/oxide interface and is reduced to oxygen ions ($O^{2-}$). The negative oxygen ions and/or the positive metal ions move through the oxide film and then combine to form the oxide. Therefore, the formation and growth of a metal oxide also significantly dependent on the surface electric state (e.g., electric potential) of the workpiece.

For the both tool wear mechanisms, the surface electric state of a workpiece is crucial to both the physical and chemical adsorption of diamond carbon and oxygen onto the surface of the workpiece and the growth of an oxide on the workpiece.

Accordingly, this invention provides a method for preventing or reducing the chemical reaction between the diamond tool and the workpiece by adjusting the surface electric state such as surface electric potential of the workpiece to be adequate so that the physical and chemical adsorption of diamond carbon and oxygen and/or oxide growth can be prevented or be much more difficult to achieve. Therefore, diamond tool life can be extended.

One preferred method for adjusting the surface electric potential of the workpiece is to electrically charge the workpiece to allow the workpiece to have a surface electric potential enough to prevent or reduce the physical and chemical adsorption of diamond carbon and oxygen and/or oxide growth.

For example, as described above, a metal workpiece is as an anode during oxide growth, meaning that the workpiece surface is positively charged. There is an electric field across the oxide layer. It is this electric field that drives the ions into the oxide layer and allows the growth of the oxide. If we apply a negative electric potential to the workpiece with a power supply, the net potential at the workpiece surface will decrease and accordingly the voltage across the oxide layer will decrease. Therefore the oxidation rate of the workpiece will decrease. The decrease extent of the oxidation rate depends on the net electric potential at the metal surface. If the net electric potential at the metal surface is adjusted to be equal to, or more negative than, the electric potential at the outer surface of the oxide layer, the oxide growth will virtually stop as the movement of metal and oxygen ions is prevented.

There are various electric charging methods available. These methods include, but not limited to, conduction or direct charging, induction or field-induced charging, contact charging, polarization charging, ionic charging, triboelectric charging, photoelectric charging, radiation charging, auto-electronic emission charging, chemical charging, and electrochemical charging. The above electric charging methods may be used individually. Alternatively, two or more of the above electric charging methods may be used together.

Two preferred charging methods of the present invention are conduction charging and induction charging.

In conduction charging, a workpiece is simply connected to a power supply that electrically charges the workpiece to obtain an electrically charged surface on the workpiece such that the surface electric potential is adequate to inhibit the chemical reaction between the diamond tool and the workpiece. Those skilled in the art understand that for conduction charging, a workpiece material needs to be either a conductor or a semiconductor.

In induction charging, a workpiece is placed in an electric field. The electric field induces to form an electrically charged surface on the workpiece such that the surface electric potential is adequate to inhibit the chemical reaction between the diamond tool and the workpiece. Induction charging is specially useful to form electrically charged surfaces on dielectric materials as the surfaces of dielectric materials are difficult to be charged with conduction charging as they are not electrically conductive.

Note that the present invention works because diamond is a dielectric material so that it will not influence the surface electric potential of a workpiece though it contacts the workpiece during diamond machining. One unique advantage of this invention is that excess electric charges (e.g., provided by a power supply), whether negative or positive, always distribute on the workpiece surface. Thus, whenever a new clean surface is exposed by the diamond tool, the surface immediately becomes electrically charged so that the chemical wear of the diamond tool can be reduced or prevented.

In order that those skilled in the art will be better able to practice the present invention, the following embodiments are given by way of illustration and not by way of limitation. In the following, the embodiments of the present invention are described in detail with reference to the drawings. Here, the same symbols and numbers indicate the same, or the corresponding, parts in the drawings.

A first embodiment of the present invention illustrates a method for adjusting the surface electric potential of a workpiece by electrically charging the workpiece with conduction charging in which an appropriate voltage is directly applied on the workpiece with a power supply such that the surface electric potential of the workpiece is adequate to inhibit the chemical reaction between the diamond tool and the workpiece during the diamond machining operation.

Figure 1:
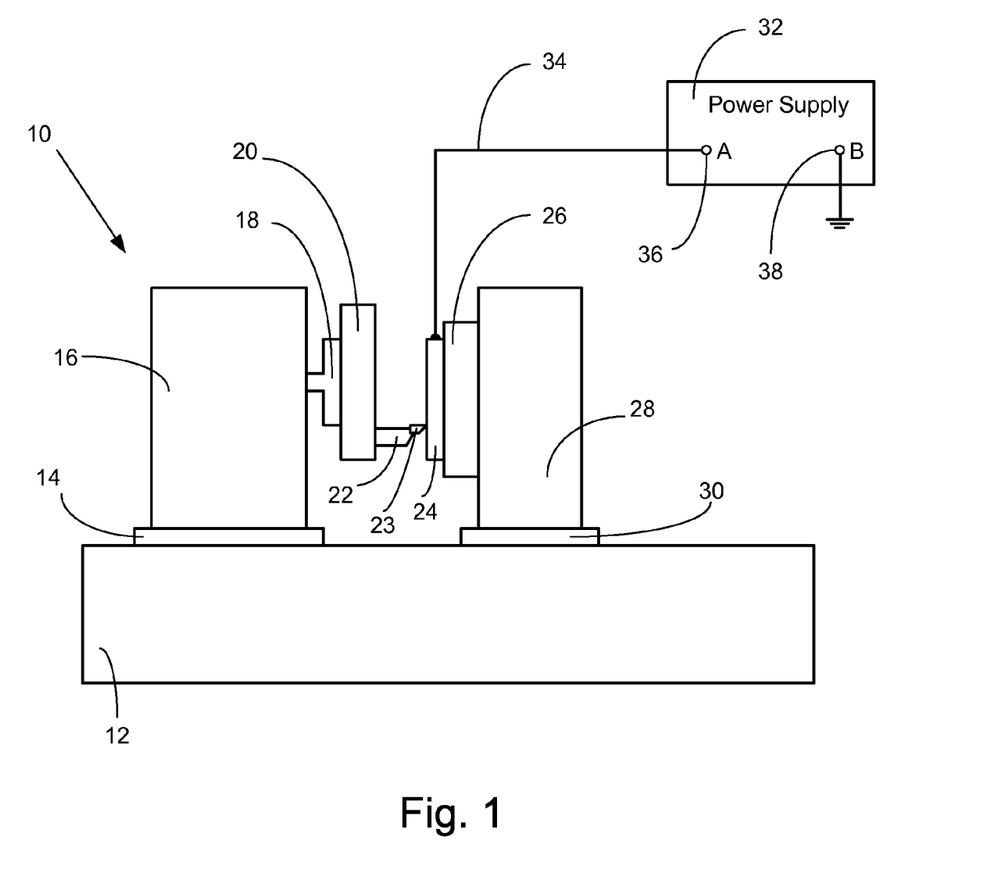
FIG. 1 is the sideview of a diamond lathe and a power supply of one embodiment of the present invention where a workpiece is held on a flat vacuum chuck and a diamond tool is mounted to a tool fixture that is attached to a rotating spindle. The workpiece is electrically connected to one output terminal of the power supply. The other output terminal of the power supply is grounded.

FIG. 1 illustrates the sideview of a typical diamond machining lathe 10. In FIG. 1, a shank 22, to which a diamond cutting tool 23 is fixed, is clamped to a tool fixture 20 which is mounted on an air bearing work spindle 18 which is housed in a headstock 16. The headstock 16 is fixed to an X-axis carriage 14 which can slide along the X-axis direction perpendicular to the paper of FIG. 1 on a lathe base structure 12 such as an epoxy granite or natural granite base structure with a passive air isolation system. This configuration can make the diamond cutting tool 23 traverse across a workpiece 24.

The workpiece 24 is held on a flat vacuum chuck 26 made of a dielectric material such as a porous ceramic. As we will apply a voltage on the workpiece 24, it is preferred that the workpiece 24 is electrically isolated from the conductive components which directly or indirectly contact with the workpiece 24. Thus the ceramic vacuum chuck 26 is a good choice for this purpose. Alternatively, other workpiece fixturing systems such as magnetic chucks, mechanical chucks or the like may also be used as long as the workpiece can be electrically isolated. Note that although the diamond cutting tool 23 contacts the workpiece 24, it will not make the workpiece 24 electrically contact the other conductive components of the lathe 10 through the diamond cutting tool 23 as diamond is a dielectric material. The shank 22 and the diamond cutting tool fixture 20 are usually made of metals. They may be covered with a dielectric coating or the like so that the workpiece 24 is kept electrically isolated even chips from the workpiece 24 contact the shank 22 and the tool fixture 20. The vacuum chuck 26 is mounted on a supporting structure 28 which is fixed on a Z-axis carriage 30. The carriage 30 can slide along the Z-axis direction parallel to the page of FIG. 1 on the lathe base structure 12. The carriage 30 can move the workpiece 24 to or away from the diamond cutting tool 23.

The workpiece 24 is electrically connected to an output terminal A 36 of a power supply 32 with a conductive wire 34 such as a copper wire. In FIG. 1, the wire 34 is connected to the side wall of the workpiece 24. Those skilled in the art understand that there are various connection methods available no matter what shape a workpiece is, no matter where a connection site (e.g., the side wall or backside of a workpiece) is, and no matter whether a connection is direct or indirect such as via a conductive workpiece holder (not shown in FIG. 1). Multiple connections to the workpiece 24 may be employed to obtain a more uniform voltage distribution on the workpiece surface. An output terminal B 38 of the power supply 32 is grounded by such as electrically connecting the output terminal B 38 to a ground electrode. Alternatively, the output terminal B 38 may be connected to a conductive reference piece such as the supporting structure 28 that is usually made of metals. Certainly in this case, those skilled in the art understand that the structure 28 must be electrically isolated from the workpiece 24.

The power supply 32 must be selected to be capable of outputting a required voltage signal comprising amplitude, polarity, and waveform. The power supply 32 may be a direct current (DC) voltage power supply or simply a battery.

Prior to diamond machining the workpiece 24, a predetermined voltage signal to be applied is input, selected, or programmed on the power supply 32. Then turn on the power supply 32 and start the diamond machining operation. The applied voltage signal depends on the material of the workpiece 24. Those skilled in the art understand that some tests may be needed to find out a voltage signal (i.e., a predetermined voltage signal) for a specific material for preventing or reducing the chemical reaction between the diamond tool and the workpiece. Those skilled in the art also understand that for a specific material there may be an optimum voltage signal that can achieve maximum diamond tool life.

The waveform of an applied voltage signal may be in DC form, alternating current (AC) form, or the form of the combination of DC form and AC form. The waveform may be continuous or discontinuous. The waveform may also be in pulse form.

Figure 2A:
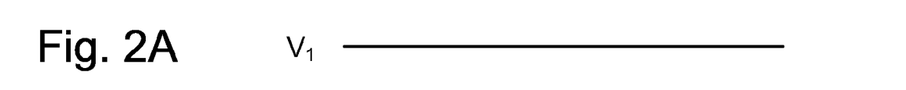
FIGS. 2A–2E schematically depict various output voltage waveforms of the power supply shown in FIG. 1 and FIG. 3.
Figure 2B:
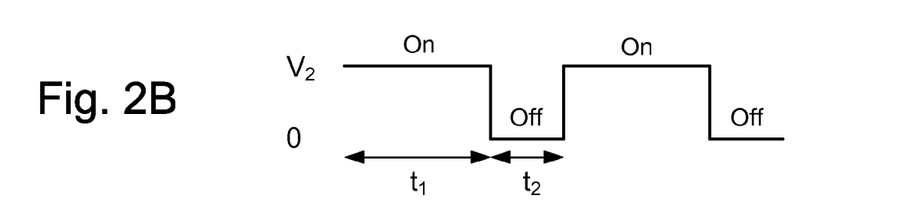
Figure 2C:
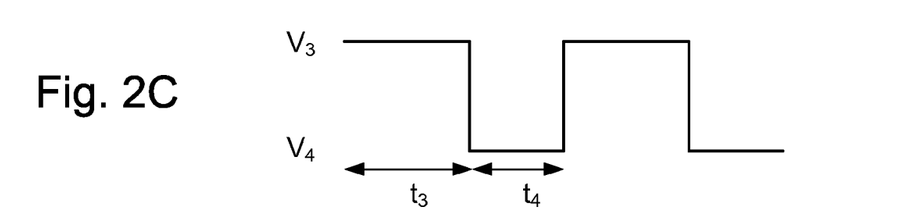
Figure 2D:
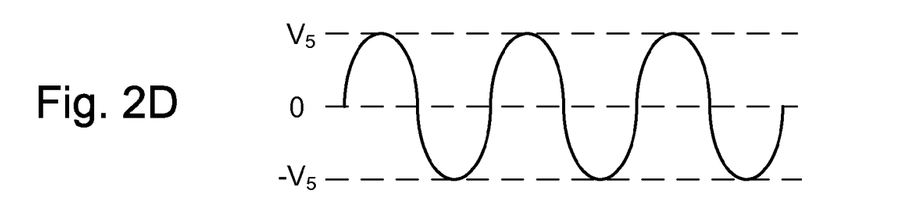
Figure 2E:
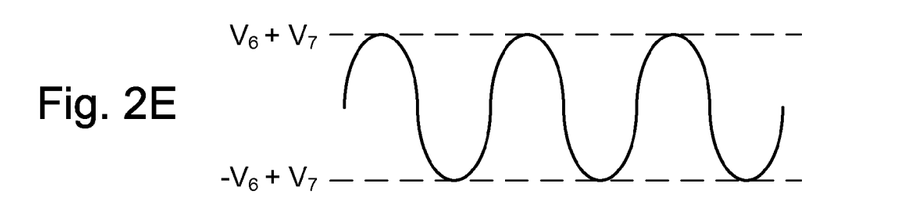

FIGS. 2A to 2E provide five voltage waveform examples that are given by way of illustration and not by way of limitation. Each of five waveforms has one or more of the waveform characteristics described above. In FIG. 2A, a voltage waveform is continuous with a constant DC voltage of $V_1$. The voltage $V_1$ may be positive or negative. In FIG. 2B, a voltage waveform is discontinuous in a periodical on/off mode. In one waveform cycle, a DC voltage of $V_2$ is applied in $t_1$ and a DC voltage of zero is applied in $t_2$. The voltage $V_2$ may be positive or negative. In FIG. 2C, a voltage waveform is in pulse DC form. In one waveform cycle, a DC voltage of $V_3$ is applied in $t_3$ and a DC voltage of $V_4$ is applied in $t_4$. The voltages $V_3$ and $V_4$ may have the same sign (positive or negative) or different signs. In FIG. 2D, a voltage waveform is a continuous AC form (sine form in this example) with a peak voltage of $V_5$. In FIG. 2E, a voltage waveform is a continuous AC form (sine form in this example) with a peak voltage of $V_6$ offset by a DC voltage of $V_7$ so that the waveform has a maximum peak voltage of $(V_6+V_7)$ and a minimum peak voltage of $(-V_6+V_7)$. Those skilled in the art understand that there are various other waveforms or waveform combinations.

A second embodiment of the present invention illustrates a method for adjusting the surface electric potential of a workpiece by electrically charging the workpiece with induction charging in which the workpiece is placed in an appropriate electric field that can induce the surface electric potential of the workpiece to be adequate to prevent or reduce the chemical reaction between diamond tool and workpiece during the diamond machining operation.

Figure 3:
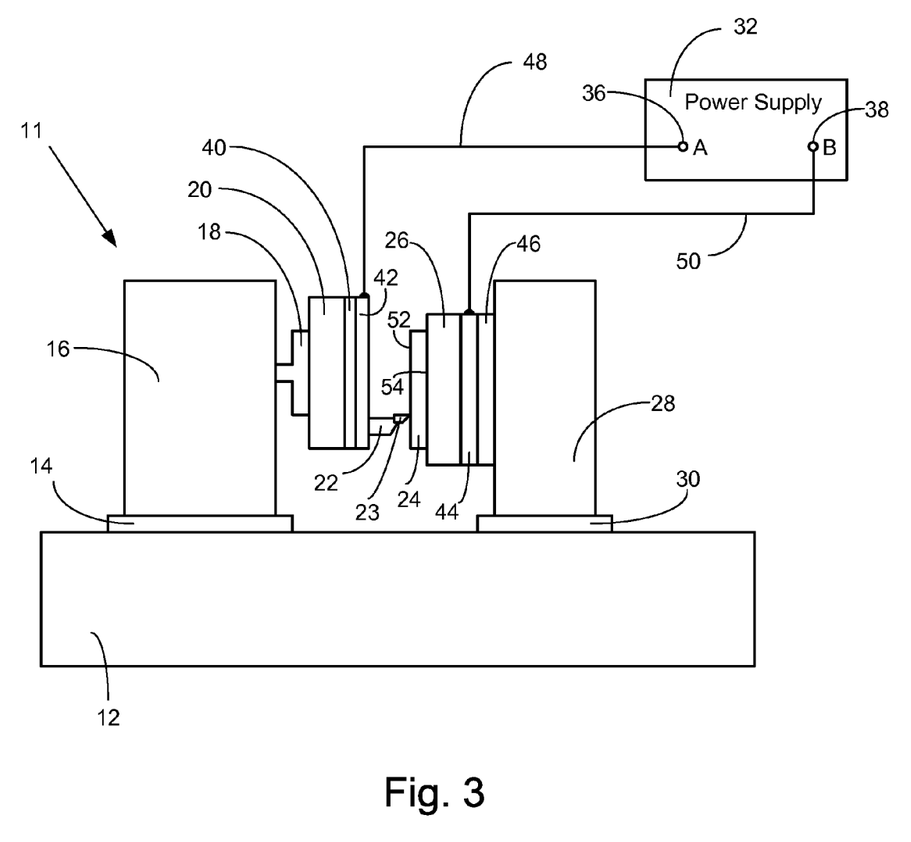
FIG. 3 is the sideview of a diamond lathe and a power supply of one embodiment of the present invention where a workpiece is held on a flat vacuum chuck and a diamond tool is mounted to a tool fixture that is attached to a rotating spindle. Two electrodes on the diamond lathe are electrically connected to the two output terminals of the power supply.

FIG. 3 illustrates the sideview of a diamond machining lathe 11 that is modified from the lathe 10 shown in FIG. 1. The lathe 11 is basically the same as the lathe 10, except that four additional components are added on the lathe 11, which are used for generating an electric field in which the workpiece 24 is induced to form an electrically charged surface. A dielectric component 40 such as an alumina ceramic disk is mounted on the tool fixture 20. A conductive electrode 42 such as a metal electrode is fixed on the dielectric component 40. The function of the dielectric component 40 is to electrically isolated the electrode 42 from the other parts of the lathe 11. Another electrode 44 is placed in between the vacuum chuck 26 and a dielectric component 46 to form a sandwich structure that is mounted on the supporting structure 28. Again, the function of the dielectric component 46 is to electrically isolated the electrode 44 from the other parts of the lathe 11. The electrode 42 is connected to the output terminal A 36 of the power supply 32 via a conductive wire 48. The electrode 44 is connected to the output terminal B 38 via a conductive wire 50. As described above in the first embodiment, the shank 22 and the electrode 42 may be coated with a dielectric coating for prevention from the electrical contact between the workpiece 24 and the electrode 42 via chips from the workpiece 24 and for prevention from the electrical contact between the workpiece 24 and the shank 22 via chips from the workpiece 24.

Prior to diamond machining the workpiece 24, a predetermined voltage signal to be applied is input, selected or programmed on the power supply 32. Then turn on the power supply 32 and start the diamond machining operation. An electric field is formed between the electrode 42 and the electrode 44. As the workpiece 24 is in this electric field, the workpiece surface becomes electrically charged due to electric field induction. For example, if a predetermined voltage signal is applied to the electrodes 42 and 44 such that the electrode 42 has a positive voltage and the electrode 44 has a negative voltage, a workpiece surface 52 facing the electrode 42 will become negatively charged due to electric field induction. If the workpiece 24 is a conductor such as a metal, the charging mechanism is that free electrons in the workpiece 24 are attracted to the workpiece surface 52 as the surface of the electrode 42 is positively charged. Obviously, an opposite workpiece surface 54 of the surface 52 becomes positively charged as the free electrons in the workpiece 24 move to the workpiece surface 52 and the opposite workpiece surface 54 is left with an excess of positive charge. If the workpiece 24 is an insulator, the charging mechanism is that the electric field polarizes atoms or molecules in the workpiece 24 so that they become dipoles. Each dipole has a positive charge at one end and a negative charge at the other end. The electric field also orientates the dipoles so that the negative ends of the dipoles face the positive electrode 42 and the positive ends of the diploes face the negative electrode 44. Therefore, the workpiece surface 52 facing the electrode 42 also becomes negatively charged.

The applied predetermined voltage signal between the electrode 42 and the electrode 44 must induce the surface 52 of the workpiece 24 to form an electrically charged surface having an electric potential being adequate to inhibit the chemical reaction between the diamond tool 23 and the workpiece 24. Those skilled in the art understand that some tests may be needed to find out such a voltage signal (i.e., a predetermined voltage signal) for a specific material. Those skilled in the art also understand that for a specific material there may be an optimum voltage signal that can achieve maximum diamond tool life.

As described in the first embodiment, the waveform of an applied voltage signal for inducing the workpiece 24 may be in DC form, AC form or the form of the combination of DC form and AC form. The waveform may be continuous or discontinuous. The waveform may also be in pulse form. Therefore, the electric field generated with the power supply 32 may be static if the waveform of an applied voltage signal is continues with a constant DC voltage (e.g., the waveform shown in FIG. 2A) or dynamic if the waveform of an applied voltage signal is such as in pulse DC form (e.g., the waveform shown in FIG. 2C).

In the above two embodiments, the diamond tool 23 is set rotatable and the workpiece 24 is held stationary. It is sometime desirable to spin the workpiece 24 and hold the diamond tool 23 stationary. Those skilled in the art will easily understand that the principles of this invention can also be applied to this configuration.

From the above description, one great advantage of the present invention is that only a power supply and some accessories such as electrodes are needed for extending diamond tool life. No complex equipment integration, no complex diamond machining lathe modification, and no difficult setup and operations are required.

It should note that all the features disclosed as well as combinations of the features disclosed are the object of this invention. While the present invention has been described with reference to particular embodiments and implementation thereof, it will be understood that many further embodiments, alternatives, modifications and implementations will be apparent by those skilled in the art without actually departing from the spirit and scope of the invention as defined in the above description. As such, it is not intended that the invention be limited to the particular illustrative embodiments and implementations described above but instead that it be solely limited by the claims presented hereafter.

What is claimed is:

1. A method for extending the life of a diamond tool in diamond machining of a workpiece that chemically reacts with the diamond tool, comprising:
   (a) adjusting the surface electric potential of the workpiece to be adequate to inhibit the chemical reaction between the diamond tool and the workpiece at least during a part of the time period in which the workpiece is machined with the diamond tool.

2. The method of claim 1 wherein the surface electric potential of the workpiece is adjusted, comprising:
   (a) electrically charging the workpiece at least during a part of the time period in which the surface electric potential of the workpiece is adjusted.

3. The method of claim 2 wherein the workpiece is electrically charged, comprising:
   (a) using conduction charging at least during a part of the time period in which the surface electric potential of the workpiece is adjusted by electrically charging the workpiece.

4. The method of claim 3 wherein the conduction charging is applied to the workpiece, comprising:
   (a) providing a power supply comprising two output terminals;
   (b) providing an electrode;
   (c) electrically connecting the workpiece to one terminal of the power supply;
   (d) electrically connecting the electrode to the other terminal of the power supply; and
   (e) applying a predetermined voltage signal supplied by the power supply to the workpiece and the electrode such that the surface electric potential of the workpiece is adjusted to be adequate to inhibit the chemical reaction between the workpiece and diamond tool.

5. The method of claim 4 wherein the power supply is a direct current (DC) voltage power supply.

6. The method of claim 4 wherein the electrode is a ground electrode.

7. The method of claim 4 wherein the predetermined voltage signal comprises at least one direct current (DC) voltage value.

8. The method of claim 2 wherein the workpiece is electrically charged, comprising:
   (a) using induction charging at least during a part of the time period in which the surface electric potential of the workpiece is adjusted by electrically charging the workpiece.

9. The method of claim 8 wherein the induction charging is applied to the workpiece, comprising:
   (a) providing a power supply comprising two output terminals;
   (b) providing two electrodes;
   (c) electrically connecting one electrode of the two electrodes to one terminal of the power supply;
   (d) electrically connecting the other electrode of the two electrode to the other terminal of the power supply;
   (e) applying a predetermined voltage signal supplied by the power supply to the two electrodes to generate an electric field between the two electrodes; and
   (f) disposing the two electrodes such that the workpiece is located in the generated electric field that induces the workpiece to have an adequate surface electric potential such that the chemical reaction between the workpiece and diamond tool is inhibited.

10. The method of claim 9 wherein the power supply is a direct current (DC) voltage power supply.

11. The method of claim 9 wherein the predetermined voltage signal comprises at least one direct current (DC) voltage value.

12. The method of claim 1 wherein the workpiece comprises nickel.

13. The method of claim 1 wherein the workpiece comprises steel.

14. The method of claim 1 wherein the workpiece comprises copper.

15. The method of claim 1 wherein the workpiece comprises iron.

16. The method of claim 1 wherein the diamond machining is diamond turning.

17. The method of claim 1 wherein the diamond machining is diamond milling.

* * * * *